United States Patent [19]

Kimura

[11] Patent Number: 5,248,908
[45] Date of Patent: Sep. 28, 1993

[54] 3-STATE BIDIRECTIONAL BUFFER AND PORTABLE SEMICONDUCTOR STORAGE DEVICE INCORPORATING THE SAME

[75] Inventor: Masatoshi Kimura, Itami, Japan

[73] Assignee: Mitsubishi Denki Kabushiki Kaisha, Tokyo, Japan

[21] Appl. No.: 714,872

[22] Filed: Jun. 13, 1991

[30] Foreign Application Priority Data

Oct. 3, 1990 [JP] Japan ................... 2-263871

[51] Int. Cl.⁵ ............... H03K 19/173; G11C 7/00
[52] U.S. Cl. .................. 307/465; 307/443;
307/243; 307/473; 365/189.05; 365/189.11
[58] Field of Search .............. 307/243, 443, 473, 465;
365/189.01, 189.05, 189.11

[56] References Cited

U.S. PATENT DOCUMENTS

| | | | |
|---|---|---|---|
| 4,734,885 | 3/1988 | Luich | 307/465 |
| 4,829,203 | 5/1989 | Ashmore, Jr. | 307/465 |
| 4,970,692 | 11/1990 | Ali et al. | 365/189.01 |

FOREIGN PATENT DOCUMENTS 2-208889 8/1990 Japan.

Primary Examiner—Edward P. Westin
Assistant Examiner—Benjamin D. Driscoll
Attorney, Agent, or Firm—Leydig, Voit & Mayer

[57] ABSTRACT

A 3-state bidirectional buffer is directly connected with a data bus for a PROM, and it comprises a voltage dropping means which inputs the program power-supply voltage supplied to the PROM, then drops the input program power-supply voltage, and a bidirectional bus control means which controls the direction of the data bus on the basis of the program power-supply voltage dropped and the program input signal supplied to the PROM. A portable semiconductor storage device comprises such a 3-state bidirectional buffer inserted in a data bus for at least one PROM, and a buffer means through which a program input signal is supplied from an external circuit to the PROM.

7 Claims, 4 Drawing Sheets

3-STATE BIDIRECTIONAL BUFFER AND PORTABLE SEMICONDUCTOR STORAGE DEVICE INCORPORATING THE SAME

BACKGROUND OF THE INVENTION

1. Field of the Invention

The present invention relates to a 3-state bidirectional buffer and a portable semiconductor storage device incorporating the same and, more specifically, an improvement in the electrical characteristics and usability of the portable storage device.

2. Description of the Related Art

FIG. 3 shows the construction of a conventional portable semiconductor storage device. The storage device has a plurality of One Time Programmable Read Only Memory OTPROMs (EPROMs) or Erasable Programmable Read Only Memory $2a$ to $2h$, each OTPROM being connected, via a unidirectional buffer 3, with an address bus 7. Between each of the OTPROMs $2a$ to $2h$ and the address bus 7, a CE (chip enable) decoder 4 and a PGM (program) decoder 5 are connected. Each of the OTPROMs $2a$ to $2h$ is also connected with a data bus 13.

When a chip enable signal CE is input to the CE decoder 4, a CE selection signal is supplied from the CE decoder 4 to one of the OTPROMs $2a$ to $2h$ which has the address specified on the address bus 7. Similarly, when a program signal PGM is input to the PGM decoder 5, a PGM selection signal is supplied from the PGM decoder 5 to one of the OTPROMs $2a$ to $2h$ which has the address specified on the address bus 7. Each of the OTPROMs $2a$ to $2h$ performs, on the basis of the combination of the levels of the CE selection signal, the PGM selection signal and an OE (output enable) signal input through the unidirectional buffer 3, an operation such as a reading operation or a program operation. For example, during a reading operation, the data stored in the specified address is read from the pertinent OTPROM to the data bus 13.

In such a semiconductor storage device, the input capacitance of a signal to be input to one of the OTPROMs $2a$ to $2h$, and the output capacitance of a signal to be output therefrom are each the sum of the individual input or output capacitance of the OTPROM and the stray capacitance resulting from the circuit wiring. Therefore, the total capacitance Cit of an input signal and the total capacitance Cot of an output signal can be expressed by the following equations if the individual input capacitance of each OTPROM is expressed as Ci, the individual output capacitance of each OTPROM is expressed as Co, and the stray capacitance resulting from the circuit wiring is expressed as Cs:

$$Cit = N \times Ci + Cs$$

$$Cot = N \times Co + Cs$$

where N represents the number of OTPROMs provided in the storage device. It is assumed here that the signals are subjected to the same stray capacitance.

If $N=16$, $Ci=6$ pF, $Co=6$ pF, and $Cs=20$ pF, the total input signal capacitance Cit and the total output signal capacitance Cot calculated by the respective equations will both be 116 pF, a considerably large value. The unidirectional buffer 3, the CE decoder 4 and the PGM decoder 5, all incorporated in the semiconductor storage device shown in FIG. 3, serve to reduce the total capacitance of a signal to be input to one of the OTPROMs $2a$ to $2h$.

Let us now examine the magnitude of current that must be applied to drive an input capacitance of 116 pF. A current i is expressed in terms of a capacitance C and a change in voltage within a period $\Delta V/\Delta t$, as follows:

$$i = C \cdot \Delta V / \Delta t$$

In order to calculate the magnitude of the current, therefore, if it is assumed that $C = Cit = Cot = 116$ pF, and that a rise or drop in voltage through a voltage amplitude $\Delta V = 4$ v occurs within a rising or falling period $\Delta t = 10$ ns, the current i is expressed as follows:

$$i = 116 \times 10^{-12} \times 4/(10 \times 10^{-9}) = 46.4 \text{ mA}$$

Thus, it is understood that a considerably large current must be driven.

In order to cope with this fact, if a plurality of semiconductor memories are incorporated in a storage device, as in the case of the storage device shown in FIG. 3, the unidirectional buffer 3, the CE decoder 4 and the PGM decoder 5 must be provided to reduce the input capacitance of the storage device.

Although the capacitance on the input side can be reduced in this way, it is impossible to reduce the capacitance on the side of the data bus 13 because it is difficult to insert a buffer connected to the data bus 13.

The functions of the OTPROMs $2a$ to $2h$ will be described. Table-1 shows the functions of OTPROMs comprising, for example, the M5M27C100P (product of Mitsubishi).

TABLE 1

| MODE | CE | OE | PGM | Vpp (v) | Vcc (v) | DATA INPUT OUTPUT |
|---|---|---|---|---|---|---|
| READING | L | L | X | 5 | 5 | OUTPUT |
| OUTPUT DISABLE | L | H | X | 5 | 5 | FLOATING |
| STAND-BY (POWER DOWN) | H | X | X | 5 | 5 | FLOATING |
| WORD PROGRAM | L | H | L | 12.5 | 6 | INPUT |
| PROGRAM VERIFYING | L | L | H | 12.5 | 6 | OUTPUT |
| PAGE DATA LATCHING | H | L | H | 12.5 | 6 | INPUT |
| PAGE PROGRAM | H | H | L | 12.5 | 6 | FLOATING |
| PROGRAM INHIBITION | L | L | L | 12.5 | 6 | FLOATING |
|  | L | H | H | 12.5 | 6 |  |
|  | H | L | L | 12.5 | 6 |  |
|  | H | H | H | 12.5 | 6 |  |

As shown in Table-1, a writing operation (program operation) can be performed in a mode such as the word program mode, the program verifying mode or the page data latching mode. In order to perform such a writing operation, control over both the program voltage Vpp and the program signal PGM is necessary. Hitherto, however, there has been no buffer that is capable of controlling both the program voltage Vpp and the program signal PGM.

FIG. 4 shows a generally known conventional bidirectional buffer. The buffer includes inverters $20f$ to $20j$, and AND circuits $52a$ and $52b$. The inverters $20f$ and $20h$ input a direction control signal DIR and an output enable signal OE, respectively. The output lines from the inverters $20i$ and $20j$ serve as an input control signal line 41 and an output control signal line 42, respectively. These signal lines 41 and 42 are respectively connected with 3-state non-inverters 25a and 25b, both 3-state non-inverters 25a and 25b forming bidirectional data ports A and B. Although the input control signal line 41 and the output control signal line 42 are connected to similar bidirectional data ports, these other ports are not illustrated in FIG. 4 in order to make the explanation simple.

When the output enable signal OE received by the inverter 20h is at a high ("H") level, since the output of the inverter 20h is at a low ("L") level, the input control signal line 41 and the output control signal line 42 are both brought to an "L" level, whereby the data ports A and B assume their floating condition. When both of the received output enable signal OE and the received direction control signal DIR are at the "L" level, the input control signal line 41 is brought to the "L" level while the output control signal line 42 is brought to the "H" level, whereby the non-inverter 25a assumes its floating condition while the non-inverter 25b assumes its active condition so that transmission is possible from the data port B to the data port A. When the received output enable signal OE is at the "L" level while the direction control signal DIR is at the "H" level, since the input control signal line 41 is brought to the "H" level while the output control signal line 42 is brought to the "L" level, the non-inverter 25a becomes active while the non-inverter 25b becomes floating so that transmission is possible from the data port A to the data port B.

In this way, the conventional buffer operates, in accordance with an output enable signal OE and a direction control signal DIR, to enable either transmission from the data port A to the data port B or transmission from data port B to the data port A. However, the buffer does not have terminals for inputting the program voltage Vpp and the program signal PGM. It will be understood, therefore, that the conventional buffer is not able to cover all the functions shown in Table-1. In addition, the program voltage Vpp, which rises to 12.5 V during program operation, and thus exceeds the absolute maximum rated voltage of a general IC, makes it impossible for such a buffer to exist.

As a result, the data bus 13 connected to the OTPROMs 2a to 2h becomes continuously loaded with a large capacitance, thereby making it difficult to perform accessing at high speed.

As described above, with a conventional portable semiconductor storage device incorporating a plurality of semiconductor memories such as OTPROMs or EPROMs, the input or output capacitance is of such a great value that it has been impossible to obtain high-speed accessing. In addition, since the input and output terminals of the semiconductor memories are directly connected to an external circuit, there is a risk that the semiconductor memories may be broken or deteriorated by external static electricity or the like.

SUMMARY OF THE INVENTION

Accordingly, an object of the present invention is to provide a 3-state bidirectional buffer which is, when inserted in a data bus for semiconductor memories such as OTPROMs or EPROMs, operable to accomplish program functions of the semiconductor memories.

Another object of the present invention is to provide a portable semiconductor storage device which enables high-speed accessing and protection of the semiconductor memories from external influences such as static electricity.

In order to achieve the first object, according to one aspect of the present invention, there is provided a 3-state bidirectional buffer directly connected with a data bus for a PROM comprising: a voltage dropping means for inputting the program power-supply voltage supplied to the PROM, and for dropping the input program power-supply voltage; and a bidirectional bus control means for controlling the direction of the data bus on the basis of the program power-supply voltage dropped by the voltage dropping means and a program input signal supplied to the PROM.

In order to achieve the second object, according to another aspect of the present invention, there is provided a portable semiconductor storage device comprising: at least one PROM; a buffer means for inputting a program input signal from an external circuit, and for outputting the program input signal to the PROM; and a 3-state bidirectional buffer inserted in a data bus for the PROM, the bidirectional buffer being provided for inputting the program power-supply voltage supplied to the PROM, for dropping the input program power-supply voltage, and for controlling the direction of the data bus on the basis of the program power-supply voltage dropped and the program input signal from the external circuit.

With the 3-state bidirectional buffer according to the present invention, the voltage dropping means drops the program power-supply voltage. On the basis of the program power-supply voltage thus dropped and the program input signal supplied to the PROM, the bidirectional bus control means controls the direction of the data bus.

With the portable semiconductor storage device according to the present invention, at least one PROM of the device is connected to external circuits via a buffer means through which a program input signal is input and a 3-state bidirectional buffer which controls the direction of the data bus.

DESCRIPTION OF THE PREFERRED EMBODIMENTS

The preferred embodiments of the present invention will now be described with reference to the accompanying drawings.

Figure 1:
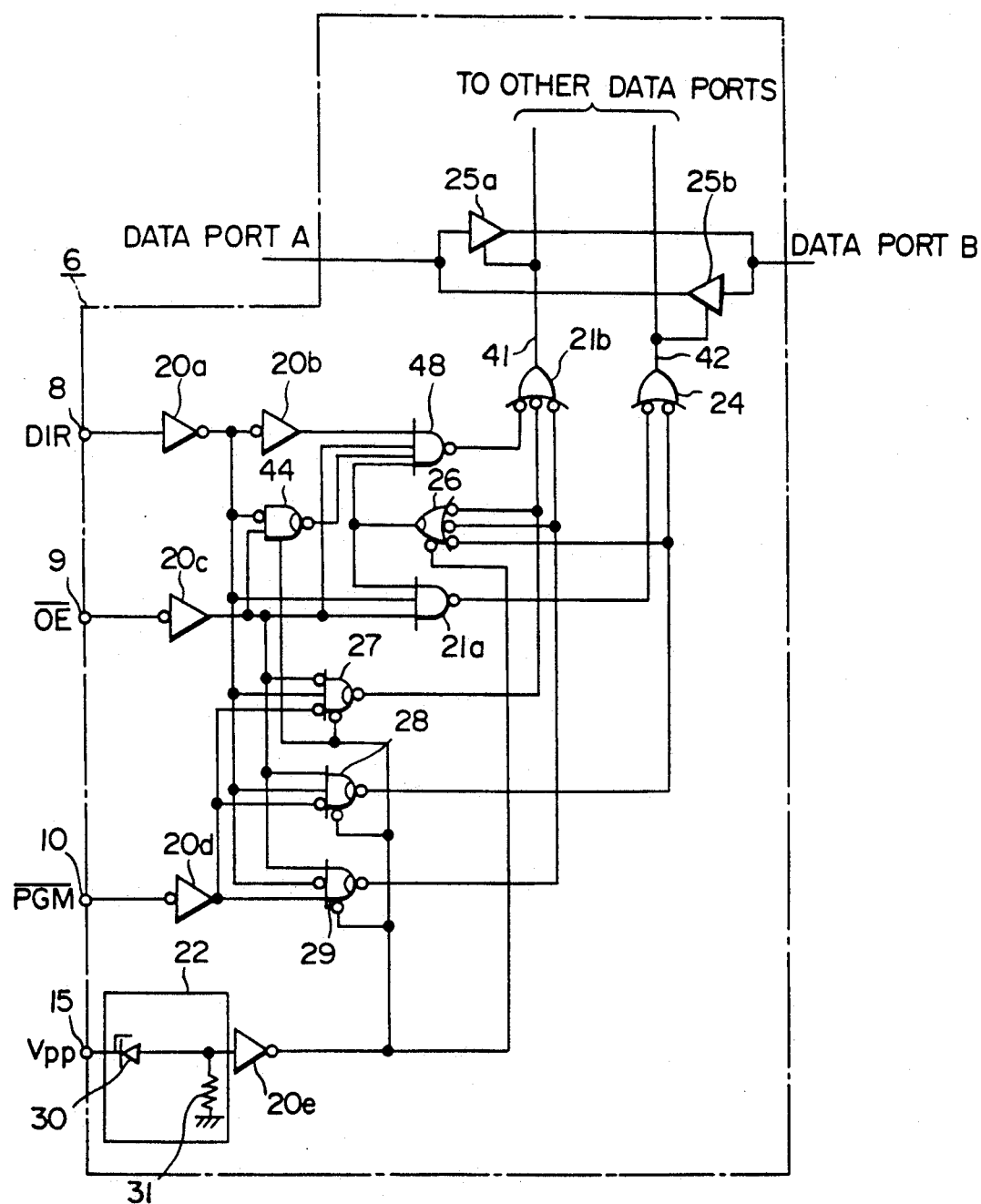
FIG. 1 is a block diagram showing a 3-state bidirectional buffer according to one embodiment of the present invention.

Referring to FIG. 1, a 3-state bidirectional buffer 6 according to one embodiment of the present invention enables the associated OTPROMs, having functions such as those shown in Table-1, to operate in various modes. The buffer 6 includes a DIR terminal 8, an OE terminal 9 and a PGM terminal 10, with inverters 20a, 20c and 20d being connected to the terminals 8, 9 and 10, respectively. Three 3-state gate circuits 27, 28 and 29 are each provided for inputting the three outputs from the inverters 20a, 20c and 20d. A fourth 3-state gate circuit 26 is connected with the outputs of the 3-state gate circuits 27, 28 and 29.

The inverter 20a is connected with another inverter 20b, and the inverters 20a and 20c are connected with a fifth 3-state gate circuit 44. A 4-input NAND circuit 48 is connected with the inverters 20b and 20c as well as the 3-state gate circuits 26 and 44. A 3-input NAND circuit 21a is connected with the inverters 20a and 20c as well as the 3-state the gate circuit 26. A second 3-input NAND circuit 21b is connected with the 3-state gate circuits 27 and 29 as well as the 4-input NAND circuit 48. A 2-input NAND circuit 24 is connected with the 3-state gate circuit 28 and the 3-input NAND circuit 21a.

The output line from the 3-input NAND circuit 21b, and the output line from the 2-input NAND circuit 24 respectively serve as an input control signal line 41 and an output control signal line 42. A pair of 3-state non-inverters 25a and 25b are connected with the signal lines 41 and 42, respectively. These non-inverters 25a and 25b have their respective inputs and outputs connected with each other in such a manner that they form a pair of bidirectional data ports A and B. Although the input control signal line 41 and the output control signal line 42 are also connected with a plurality of other bidirectional data ports in a manner similar to the connection with the data ports A and B, the illustration of these other ports are omitted from FIG. 1 in order to make the explanation simple.

The buffer 6 also includes a Vpp terminal 15 which is connected with a voltage dropping circuit 22. The output of the voltage dropping circuit 22 is connected, via an inverter 20e, with the respective control terminals of the five 3-state gate circuits 26, 27, 28, 29 and 44. The voltage dropping circuit 22 has a Zener diode 30 connected with the Vpp terminal 15, and a pull-down resistor 31 connected between the output terminal of the Zener diode 30 and the ground. When the voltage of the program power-supply Vpp input through the Vpp terminal 15 is 5 v, the circuit 22 outputs a low ("L") level signal, whereas, when the program power-supply vpp is 12.5 v, the circuit 22 outputs a high ("H") level signal. Each of the 3-state gate circuits 26, 27, 28 and 29 has a pull-up resistor provided therein, and, when the control terminal of each of the gate circuits 26 to 29 is at the "H" level, the gate circuit generates an "H" level output irrespective of the level of the signals input thereto. The 3-state gate circuit 44 also has a pull-up resistor provided therein, and, when the control terminal of the gate circuit 44 is at the "L" level, the gate circuit 44 generates an "H" level output irrespective of the level of the signals input thereto.

The voltage dropping circuit 22 constitutes a voltage dropping means. The inverters 20a to 20e, the NAND circuits 21a, 21b, 24 and 48, the non-inverters 25a and 25b, and the gate circuits 26 to 29 and 44 together constitute a bidirectional bus control means.

Next, descriptions will be given concerning the operation of the 3-state bidirectional buffer 6 according to this embodiment in the various modes shown in Table-1. It is assumed that the program input signals (shown in Table-1) for the associated OTPROMs are such that the program signal PGM is input to the PGM terminal 10 of the buffer 6, the chip enable signal CE is input to the OE terminal 9, and the output enable signal OE is input to the DIR terminal 8. It is also assumed that the program power-supply Vpp is input to the Vpp terminal 15 of the buffer 6.

In the reading mode, since the program power-supply Vpp is 5 v, the output of the voltage dropping circuit 22 is at the "L" level, so that, via the inverter 20e, an "H" level signal is supplied to each of the control terminals of the 3-state gate circuits 26, 27, 28, 29 and 44. Consequently, each of the 3-state gate circuits 26, 27, 28 and 29 generates an "H" level output irrespective of the level of the program signal PGM. In this mode, since both of the chip enable signal CE input to the OE terminal 9 and the output enable signal OE input to the DIR terminal 8 are at the "L" level, all the inputs to the 3-input NAND circuit 21a are at the "H" level so that the 3-input NAND circuit 21a supplies an "L" level signal to the 2-input NAND circuit 24. As a result, the output control signal line 42 is brought to the "H" level, thereby rendering the 3-state non-inverter 25b active. On the other hand, since the output enable signal OE input to the DIR terminal 8 is at the "L" level, the inverter 20b generates an "L" level output so that the 4-input NAND circuit 48 supplies an "H" level signal to the 3-input NAND circuit 21a. Since the outputs of the 3-state gate circuits 27 and 29 are, as described above, at the "H" level, all three inputs to the 3-input NAND circuit 21b are at the "H" level. As a result, the input control signal line 41 is brought to the "L" level, thereby bringing the 3-state non-inverter 25a into its floating condition. In this way, the transmission of data from the data port B to the data port A is made possible.

In the output-disable mode, the program power-supply Vpp is 5 v, the chip enable signal CE input to the OE terminal 9 is at the "L" level, and the output enable signal OE input to the DIR terminal 8 is at the "H" level. Therefore, irrespective of the level of the program signal PGM, the input control signal line 41 and the output control signal line 42 are both brought to the "L" level, thereby bringing both 3-state non-inverters 25a and 25b into their floating condition.

In the stand-by mode, the program power-supply Vpp is 5 v, and the chip enable signal CE input to the OE terminal 9 is at the "H" level. Therefore, irrespective of the level of the output enable signal OE and the program signal PGM, both of the input control signal line 41 and the output control signal line 42 are brought to the "L" level, thereby bringing both 3-state non-inverters 25a and 25b into their floating condition, similarly to the above-described output-disable mode.

It will be understood, therefore, the buffer 6 shown in FIG. 1 is capable of covering those functions shown in Table-1 which are provided in utility operations in the reading, output-disable, and stand-by modes.

Next, program operation that can be performed in various modes will be described. In a program operation, the program power-supply Vpp input to the Vpp terminal 15 is 12.5 v. Therefore, the voltage dropping circuit 22 generates an output at the "H" level, which is then inverted by the inverter 20e to be supplied as an "L" level signal to the respective control terminals of the 3-state gate circuits 26, 27, 28, 29 and 44. Consequently, the 3-state gate circuits 26, 27, 28 and 29 are brought into their enabled condition, and the output of the 3-state gate circuit 44 is at the "H" level irrespective of the level of the inputs thereto.

In the word-program mode, the chip enable signal CE input to the OE terminal 9 is at the "L" level, the output enable signal OE input to the DIR terminal 8 is at the "H" level, and the program signal PGM input to the PGM terminal 10 is at the "L" level. Therefore, the output of the 3-state gate circuit 29 is at the "L" level, while the respective outputs of the 3-state gate circuits 27 and 28 are at the "H" level, so that the 3-state gate circuit 26 generates an "L" level output. Consequently, the 3-input NAND circuit 21a supplies an "H" level signal to the 2-input NAND circuit 24. Thus, since both inputs of the 2-input NAND circuit 24 are at the "H" level, the output control signal line 42 is brought to the "L" level, thereby bringing the 3-state non-inverter 25b into its floating condition. On the other hand, since the output of the 3-state gate circuit 29, which serves as one of the inputs to the 3-input NAND circuit 21b, is at the "L" level, the input control signal line 41 is brought to the "H" level, thereby bringing the 3-state non-inverter 25a into its active condition. In this way, the transmission of data from the data port A to the data port B is made possible.

In the program verifying mode, the chip enable signal CE input to the OE terminal 9 and the output enable signal OE input to the DIR terminal 8 are each at the "L" level, while the program signal PGM input to the PGM terminal 10 is at the "H" level. Therefore, the output of the 3-state gate circuit 28 is at the "L" level, while the respective outputs of the 3-state gate circuits 27 and 29 are at the "H" level. Consequently, the input control signal line 41 and the output control signal line 42 are brought to the "L" level and the "H" level, respectively, thereby rendering the 3-state non-inverter 25a floating, while rendering the 3-state non-inverter 25b active. In this way, the transmission of data from the data port B to the data port A is made possible.

In the page data latching mode, the chip enable signal CE input to the OE terminal 9 and the program signal PGM input to the PGM terminal 10 are each at the "H" level, while the output enable signal OE input to the DIR terminal 8 is at the "L" level. Therefore, the output of the 3-state gate circuit 27 is at the "L" level, while the respective outputs of the 3-state gate circuits 28 and 29 are at the "H" level. Consequently, the input control signal line 41 and the output control signal line 42 are brought to the "H" level and the "L" level, respectively, thereby rendering the 3-state non-inverter 25a active, while rendering the 3-state non-inverter 25b floating. In this way, the transmission of data from the data port A to the data port B is made possible, as in the case of the word program mode.

In each of the page program mode and the program inhibition mode, all the outputs from the 3-state gate circuits 27, 28 and 29 are at the "H" level. Consequently, both of the input control signal line 41 and the output control signal line 42 are brought to the "L" level, thereby bringing both 3-state non-inverters 25a and 25b into their floating condition. In this way, the transmission of data is made impossible.

It will be understood, therefore, that the 3-state bidirectional buffer 6 according to the present invention is also capable of covering all of those functions shown in Table-1 which are provided in program operations in various modes.

Figure 2:
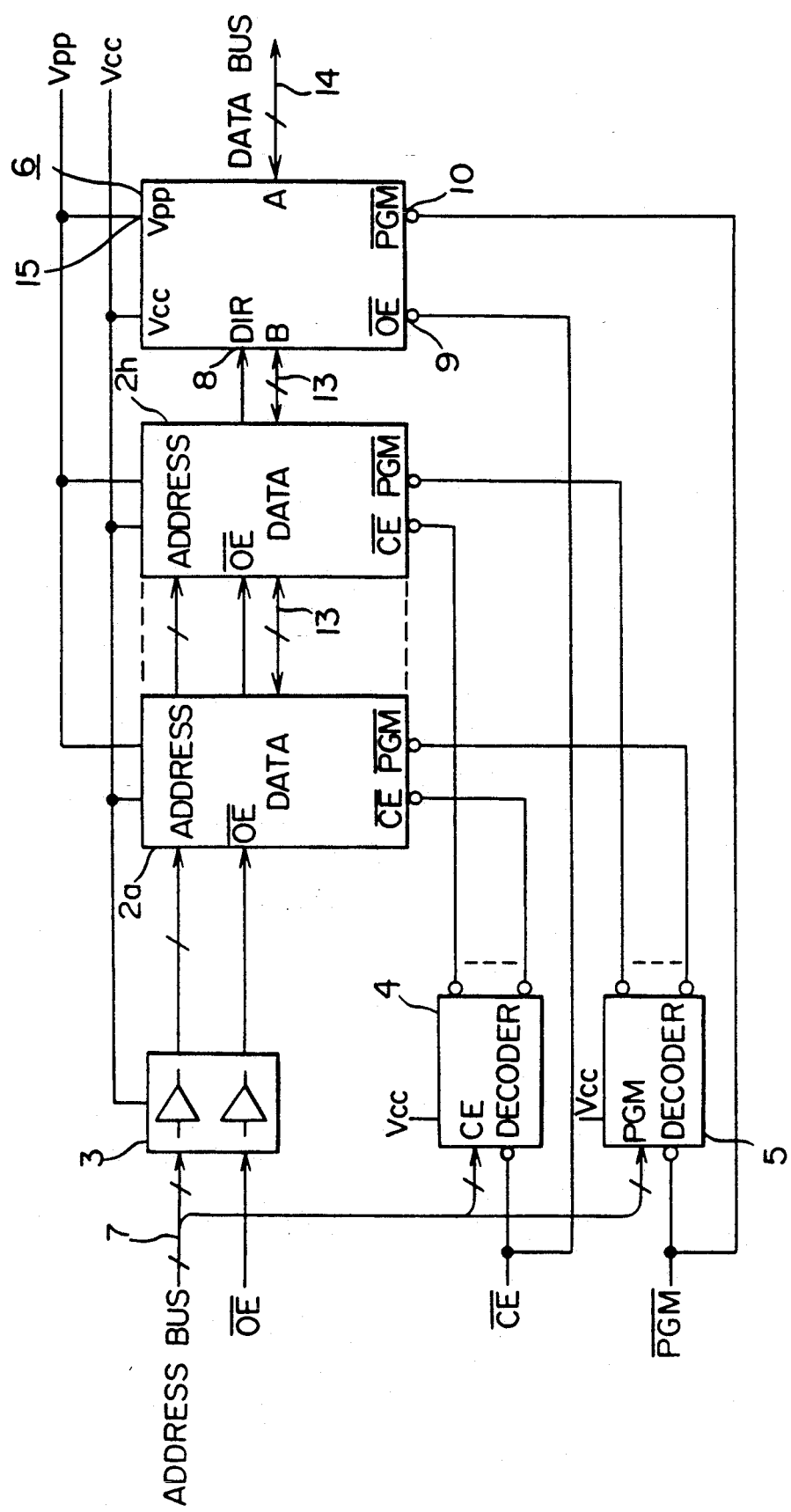
FIG. 2 is a block diagram showing a portable semiconductor storage device incorporating the bidirectional buffer shown in FIG. 1.
Figure 3:
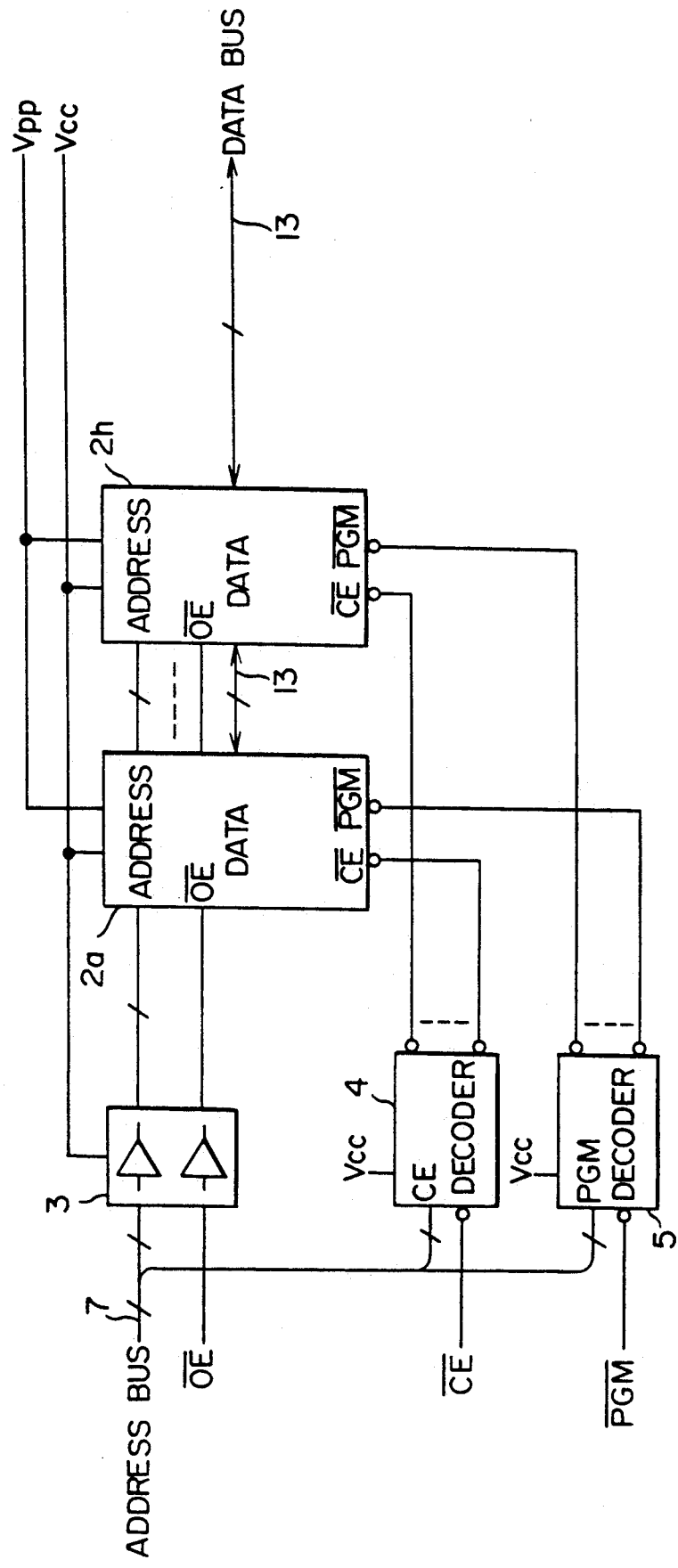
FIG. 3 is a block diagram showing a conventional portable semiconductor storage device.
Figure 4:
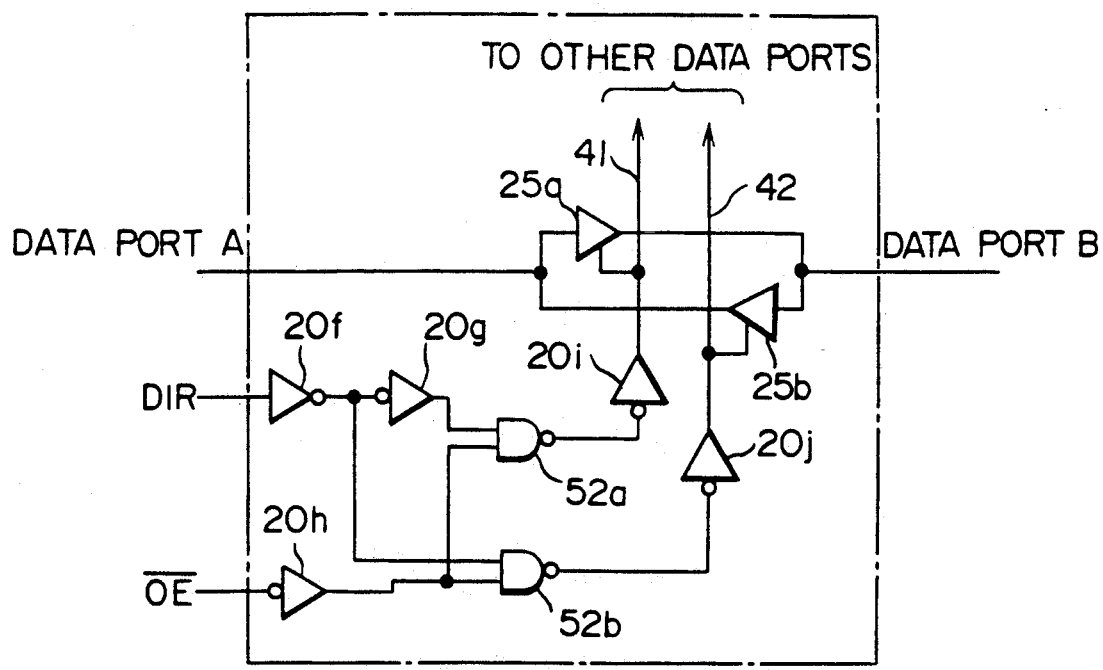
FIG. 4 is a block diagram showing a conventional bidirectional buffer.

A portable semiconductor storage device, shown in FIG. 2, is fabricated utilizing the above-described 3-state bidirectional buffer 6. The storage device has a plurality of OTPROMs 2a to 2h, each OTPROM being connected, via a unidirectional buffer 3, with an address bus 7. A CE decoder 4 and a PGM decoder 5 are connected between the address bus 7 and the each of the OTPROMs 2a to 2h. Each of the OTPROMs 2a to 2h is also connected with an internal data bus 13. The internal data bus 13 is connected, via the 3-state bidirectional buffer 6 shown in FIG. 1, with an external data bus 14. The data port A and the data port B of the buffer 6 are connected with the external data bus 14 and the internal data bus 13, respectively.

The DIR terminal 8 of the buffer 6 is connected in parallel with the respective output enable signal input terminals of the OTPROMs 2a to 2h. The OE terminal 9 and the PGM terminal 10, both of the buffer 6, are arranged to receive the chip enable signal CE input to the CE decoder 4, and the program signal PGM input to the PGM decoder 5, respectively. The Vpp terminal 15 of the buffer 6 is connected with the program power-supply Vpp.

The unidirectional buffer 3, the CE decoder 4 and the PGM decoder 5 together constitute a buffer means.

The operation of the storage device will be described. When a chip enable signal CE is input to the CE decoder 4, a CE selection signal is output from the CE decoder 4 to one of the OTPROMs 2a to 2h which has the address specified on the address bus 7, and the chip enable signal CE is input to the OE terminal 9 of the buffer 6. Similarly, when a program signal PGM is input to the PGM decoder 5, a PGM selection signal is output from the PGM decoder 5 to one of the OTPROMs 2a to 2h which has the address specified on the address bus 7, and the program signal PGM is input to the PGM terminal 10 of the buffer 6. When an output enable signal OE is input, via the unidirectional buffer 3, to the OT-PROMs 2a to 2h, the signal OE is also input to the DIR terminal 8 of the 3-state bidirectional buffer 6.

The OTPROMs 2a to 2h each perform an operation such as a reading operation or a program operation in accordance with the combination of the levels of the CE selection signal, the PGM selection signal, and the output enable signal OE. At this time, the 3-state bidirectional buffer 6 performs, as described above, suitable control of the direction of the data bus 13 for one of the modes shown in Table-1. In particular, during the program operations in which the voltage of the program power-supply Vpp is raised to 12.5 v from 5 v adopted during the utility operations, the program power-supply voltage is dropped by the voltage dropping circuit 22 of the buffer 6 so as to control the buses in correspondence with each of the modes such as the word program mode and the program verifying mode, and enable the program operations to be performed in this way.

Because the 3-state bidirectional buffer 6 provided in the storage device is capable of driving current of a large magnitude, it is possible, even if a large number of OTPROMs 2a to 2h are incorporated, to greatly curtail the rise time and the fall time of the data bus 14, thereby making it possible to obtain electrical characteristics which are close to those of a single OTPROM, and high-speed accessing.

Because the OTPROMs 2a to 2h are fabricated by high-precision processes, the input and output terminals of the OTPROMs are, in general, vulnerable to static electricity from outside when compared with those of other ICs such as the buffer 6. With the storage device shown in FIG. 2, since all the input and output terminals of the OTPROMs 2a to 2h are connected with external circuits via the corresponding ones of the unidirectional buffer 3, the CE decoder 4, the PGM decoder 5 and the 3-state bidirectional buffer 6, the OTPROMs 2a to 2h are protected from external influences such as static electricity. Accordingly, it is possible to accomplish a portable semiconductor storage device that is capable of providing a high level of reliability and a high level of performance.

Although in the above-described embodiments the semiconductor memories comprise OTPROMs, the present invention is not intended to be limited thereto. Alternatively, other types of PROMs such as EPROMs may be used, with similar effects being obtained. Further, the various functions shown in Table-1 are mere examples. Even if semiconductor memories having functions based on a different truth table are used, a 3-state bidirectional buffer and a storage device incorporating the same, which are suitable for the semiconductor memories used, can be prepared in a similar manner.

Still further, although the 3-state bidirectional buffer shown in FIG. 1 has a voltage dropping circuit 22 comprising a Zener diode 30 and a pull-down resistor 31, the present invention is not intended to be limited thereto. The voltage dropping circuit may have any other construction so long as it is capable of dropping the voltage of the program power-supply Vpp.

What is claimed is:

1. A 3-state bidirectional buffer directly connected with a data bus for a PROM comprising:
   a voltage dropping means for inputting a program power-supply voltage supplied to said PROM, and for dropping the input program power-supply voltage; and
   a bidirectional bus control means for controlling the direction of said data bus on the basis of the program power-supply voltage dropped by said voltage dropping means and a program input signal supplied to said PROM.

2. A bidirectional buffer as claimed in claim 1 wherein said voltage dropping means comprises a Zener diode, and a pull-down resistor connected between the anode terminal of said Zener diode and the ground.

3. A bidirectional buffer as claimed in claim 1 wherein said bidirectional bus control means comprises a plurality of bidirectional data ports connected to said data bus, an input control signal line and an output control signal line which are commonly connected to said plurality of bidirectional data ports, and a control circuit for controlling the electric potentials of said input control signal line and said output control signal line on the basis of the program power-supply voltage dropped by said voltage dropping means and the program input signal supplied to said PROM.

4. A bidirectional buffer as claimed in claim 3 wherein said control circuit controls the electric potentials of said input control signal line and said output control signal line on the basis of the program power-supply voltage dropped by said voltage dropping means, and the program signal, the chip enable signal and the output enable signal, all supplied to said PROM.

5. A portable semiconductor storage device comprising:
   at least one PROM being programmed with a programmer power supply voltage;
   a buffer means for inputting a program input signal from an external circuit, and for outputting the program input signal to said PROM; and
   a 3-state bidirectional buffer inserted in a data bus for said PROM, said bidirectional buffer for inputting the program power-supply voltage, for dropping the input program power-supply voltage, and for controlling the direction of said data bus on the basis of the program power-supply voltage dropped and the program input signal from the external circuit.

6. A storage device as claimed in claim 5 wherein said PROM is an EPROM.

7. A storage device as claimed in claim 5 wherein said PROM is an OTPROM.

* * * * *